Patented Oct. 7, 1952

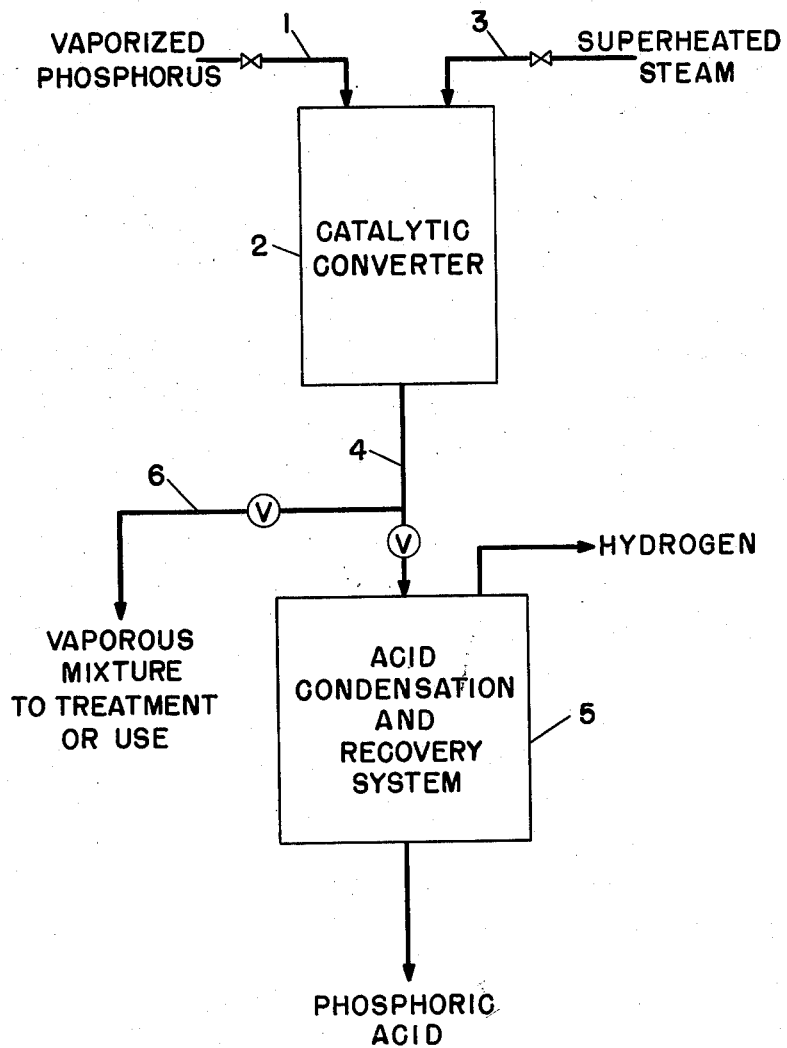

2,613,134

UNITED STATES PATENT OFFICE 2,613,134

OXIDATION OF PHOSPHORUS WITH STEAM

Kelly L. Elmore, Sheffield, Ala., assignor to Tennessee Valley Authority, a corporation of the United States Application September 27, 1950, Serial No. 186,979

4 Claims. (Cl. 23—165)

(Granted under the act of March 3, 1883, as amended April 30, 1928; 370 O. G. 757)

The invention herein described may be manufactured and used by or for the Government for governmental purposes without payment to me of any royalty thereon.

This invention relates to improved catalytic methods for the oxidation of phosphorus with steam. This application is a continuation-in-part of my pending application Serial No. 56,242, filed October 23, 1948, now abandoned.

The oxidation of phosphorus with steam to produce phosphoric acid and hydrogen has been studied by a number of investigators. Various conditions of pressure and temperature and a number of catalysts have been suggested. The processes which have been proposed fall into two general classes. In the first of these the reaction is carried out in liquid phase under pressure and at relatively low temperatures, as is shown by U. S. Patent 1,848,295, Ipatiew. In the second class phosphorus is reacted with steam in gas phase at relatively low pressure and at relatively high temperature, as is shown by U. S. Patent 1,605,960, Liljenroth and Larsson.

The first class as typified by Ipatiew has the advantage that relatively low temperature is used and that the hydrogen is generated under pressure. This type operation, however, has a number of disadvantages which tend to nullify the advantages and make the process unsuitable for practical use. In operations of this type, the reactants must be pumped in the form of an emulsion into the reaction chamber against high pressure, an operation which involves many difficulties. The proportion of water required to give a stable emulsion results in the production of weak phosphoric acid, frequently as low as 50 per cent $H_3PO_4$, which is too dilute for many purposes. And finally, operation in liquid phase results in very severe corrosion of equipment and in conversion of part of the reacting white phosphorus to the solid red form, which causes plugging of pumps and nozzles.

Operation of the liquid-phase process apparently has never been attempted on a commercial scale. The many difficulties inherent in the process have caused attention to be turned to the gas-phase method. The latter, as is shown by Liljenroth, is carried out at about 1000° C. without a catalyst or at temperatures as low as 700° C. in the presence of catalysts. Catalysts for this reaction which have been mentioned in patents are the nonalkaline metals of the first group of the periodic system, all the metals of the sixth to eighth groups and their phosphides, metallic orthophosphates, ferric oxide, ferrosilicon, various silicates, activated carbon, and others.

Attempts have been made to operate the gas-phase process on a commercial or semicommercial scale both in this country and in Europe. Apparently these attempts were unsuccessful, since no commercial plant is in operation at present so far as is now known. The results of work reported by Britzke and Pestov (Trans. Sci. Inst. Fert. (Moscow) 59, pp. 5-160, 1929) indicate that the trouble has been both incompleteness of reaction and contamination of the desired products by side products of the phosphorus-steam reaction. The principal contaminants in the products are phosphine in the hydrogen produced and phosphorous acid in the phosphoric acid. Phosphine is very undesirable if the hydrogen is to be used in ammonia synthesis, because phosphine is a poison to ammonia synthesis catalysts. Phosphine is also highly poisonous to workmen who may be exposed to its fumes.

The vapor-phase oxidation of phosphorus with steam was attempted at the Tennessee Valley Authority's plant at Muscle Shoals. A number of catalysts shown in the prior art were tested as to their efficiency in this reaction. It was found that silver metal as disclosed by Liljenroth in U. S. Patent 1,605,960 had high initial catalytic activity but that it was attacked by the reaction products and was rapidly removed from the reaction chamber. This same disadvantage was found to occur when copper or platinum was used. Copper silicate was tested and was found to have high catalytic activity, but was also found to disintegrate rapidly in the reaction chamber. Cobalt phosphide was tested and found to be lacking in sufficient catalytic activity to cause complete oxidation of phosphorus at practical temperatures and rates of flow. None of these catalysts were found to be completely satisfactory for commercial use.

Apparently no prior investigators have been successful in developing a practical catalytic method for continuously producing an equilibrium mixture by the phosphorus-steam reaction for sustained periods of time. To be practical commercially, such process must employ a catalyst that not only has a sufficiently high degree of activity as to oxidize substantially all elemental phosphorus into trivalent or pentavalent states with rapid production of a complex equilibrium mixture at practical temperatures and rates of flow, but must also have sufficient physical strength to prevent disintegration in use for long periods of time and have sufficient chemical stability to prevent excessive loss of catalyst from the reaction zone.

The composition of the equilibrium mixture produced by this reaction at fairly high temperatures is unknown, but it apparently contains no phosphine although considerable quantities of other compounds in which phosphorus is trivalent are present. This equilibrium mixture may be cooled and condensed without further treatment when the presence of trivalent phosphorus compound in the phosphoric acid produced is immaterial. Small quantities of phosphine apparently form during cooling and will be present in the hydrogen product.

It is an object of this invention to provide a method for vapor-phase oxidation of phosphorus by water vapor that is adaptable to sustained commercial use.

Another object is to provide a catalytic method adapted to give substantially complete oxidation of phosphorus by steam in vapor phase with production of a complex equilibrium mixture in which substantially all phosphorus is present in pentavalent and trivalent states.

Other objects and features of novelty will be either specifically pointed out or will become apparent upon reference to the following description, claims, and drawings which describe and show an illustrative embodiment of this invention.

I have now found that commercially practical catalysts may be obtained by supporting a material selected from the group consisting of copper, copper phosphide, platinum, and the platinum phosphides upon a material selected from the group consisting of aluminum orthophosphate, aluminum metaphosphate, aluminum phosphide, and mixtures thereof. By passing a mixture of phosphorus and water in vapor phase over and in intimate contact with such catalysts at temperatures in the range from about 600° to 900° C., I have found that it is possible to produce an equilibrium mixture in which substantially all phosphorus is oxidized to the pentavalent or trivalent state.

The accompanying drawing is a schematic diagram illustrating a process embodying my invention.

With reference thereto, vaporized phosphorus, from any suitable source (not shown), enters via line 1 and is led to catalytic converter 2. An inert carrier gas may be admixed with this vaporized phosphorus if desired. Water vapor, preferably in the form of superheated steam, form any suitable source (not shown), is led into the system via line 3. Line 3 may be arranged to connect with line 1 outside converter 2 if desired, or may enter converter 2 directly as is illustrated, since for operation of my process it is necessary merely to commingle the vapors of phosphorus and water in a manner to secure a fairly homogeneous mixture. The rate of introduction of vapors is controlled so that the ratio of water vapor to phosphorus vapor in the resulting mixture is in the range from about 16:1 to 30:1, or preferably in the range from about 20:1 to 25:1.

The mixture of vapors in converter 2 is then passed over and in intimate contact with a catalyst comprising a material selected from the group consisting of copper, copper phosphide, platinum, and the platinum phosphides supported upon a material selected from the group consisting of aluminum orthophosphate, aluminum metaphosphate, aluminum phosphide, and mixtures thereof. A method for preparing such catalysts is described subsequently herein.

The degree of pressure maintained in converter 2 is not very critical, but low pressures or substantially atmospheric pressure is preferred because equipment for such pressures can be constructed cheaply. The temperature of catalyst and reactants in converter 2 is maintained in the range from about 600° to 900° C. The reaction occurs over this entire temperature range, but with many arrangements of beds of catalyst there is likely to be some accumulation of liquid acids of phosphorus on the catalyst when temperatures below 650° C. are used. I prefer to operate in the temperature range from about 650° to 500° C. in order to avoid any possibility of accumulation of liquid acid on the catalyst or, still more preferably, in the range from about 650° to 700° C.

The mixture of vapors is passed over the catalyst at a rate of flow in the range from about 500 to 7500 volumes per volume of catalyst per hour. The phosphorous acid content of the phosphoric acid produced increases somewhat with the rate of flow, probably because of failure to approach equilibrium conditions in the catalyst bed. I prefer to operate at rates of flow in the range from about 500 to 2000 volumes of vapor per volume of catalyst per hour when it is desired to produce phosphoric acid containing minimum amounts of phosphorous acid.

Reaction products are withdrawn from converter 2 via valved line 4 and may be led to an acid condensation and recovery system 5. Here the products may be cooled and partially condensed and are separated by the use of suitable conventional methods and apparatus for separating condensable vapors from noncondensable gases. Alternatively, the equilibrium mixture may be withdrawn via valved line 6 to use or further treatment as desired.

The catalyst used in my process may be prepared by soaking the supporting material in a solution of the chloride or nitrate of the metal to be supported thereon, decomposing the residual salt by heating, and, if necessary, reducing any resulting oxide by heating in an atmosphere of hydrogen at about 450° C. The resulting metal may then be converted in whole or in part to the corresponding phosphide, if desired, by heating with phosphorus vapor in an inert atmosphere. The supporting materials of my invention are aluminum orthophosphate, aluminum metaphosphate, aluminum phosphide, and mixtures thereof. These may be prepared by any of the well-known processes, but I prefer to prepare aluminum orthophosphate by reacting metallic aluminum with phosphoric acid; to prepare aluminum metaphosphate by heating aluminum oxide and/or aluminum orthophosphate with phosphoric acid at about 800° to 900° C. until sintered; and to prepare aluminum phosphide by mixing powdered aluminum with red phosphorus and heating the resulting mixture in an atmosphere of hydrogen.

I prefer to use a supporting material which is a mixture of aluminum ortho- and metaphosphates, in proportions such that the total composition corresponds to about 75 percent to 78 percent $P_2O_5$ and about 25 per cent to 22 per cent $Al_2O_3$. This may be prepared by mixing aluminum orthophosphate with sufficient water to form a mud, drying this mud to apparent dryness at about 100° C., and heating the dry product to about 700° to 900° C. for several hours in an atmosphere of vapors of phosphorus and water.

Catalysts prepared as described should preferably be broken up and screened to uniform size before use. For example, a catalyst prepared by making aluminum orthophosphate into a mud with chloroplatinic acid solution, dried at about 100° C., decomposed in a stream of nitrogen at about 580° C., then broken and screened to obtain particles passing a standard 7-mesh screen and retained on a 12-mesh screen, gave excellent results in my process.

Catalysts prepared as described above are highly advantageous over those previously used in the oxidation of phosphorus with steam. The supporting material retains the metal deposited on it far more effectively than other supports. Thus, loss of metal from the converter is so greatly reduced that the process becomes commercially practical. In addition to this advantage, the supporting material itself has some catalytic activity, and in combination with the metal deposited on its drives the reaction more nearly to completion than the catalysts of the prior art and results in greater purity of the products.

The following examples illustrate typical results obtained by the use of some of my catalysts and methods.

Example I

Vapors of water and phosphorus were mixed in proportions of 22:1 and were passed over catalysts of my invention at a temperature of 700° C. and at a space velocity of 500 volumes per volume of catalyst per hour, except where noted as otherwise, and the following results were obtained.

| Composition of catalyst: | Phosphorus oxidized, per cent |
|---|---|
| 10% PtP$_2$ on AlPO$_4$ | 99.7 |
| 10% Pt on AlPO$_4$ [1] | 99.2 |
| 3% Pt on mixture of Al ortho- and metaphosphates [2, 3] | 99.3 |
| 14% Cu on AlPO$_4$ | 99.0 |
| 1% Cu on mixture of Al ortho- and metaphosphates [2] | 99.7 |
| 0.26% Cu on Al(PO$_3$)$_3$ | 99.6 |

[1] Space velocity 2500 volumes per volume of catalyst per hour.
[2] Mixture contained from 75% to 78% P$_2$O$_5$ and from 25% to 22% Al$_2$O$_3$.
[3] Space velocity 2000 volumes per volume of catalyst per hour.

Copper phosphide catalysts were also tried experimentally, but these did not give quite as good results as the catalysts listed above. All these catalysts were stable and were not removed from the reaction zone to a degree that would make the process uneconomical in commercial operation.

Example II

Experimental work described in Example I was repeated, using mixtures of vapors of water and phosphorus in ratios varying from 19:0 to 24.6:1 and with space velocities varying from 500:1 to 10,000:1. Oxidation of phosphorus in excess of 99 per cent was obtained at all velocities up to 7500:1, but decreased when the velocity exceeded this value. Increases in phosphorous acid in the phosphoric acid product were observed with increase in velocity.

Example III

Experimental work described in Example I was repeated, using ratios of water vapor to phosphorus vapor in the range from 14:1 to 78:1 and with temperatures in the range from 600° to 900° C. Oxidation of phosphorus was incomplete and high percentages of phosphorus acid were produced without respect to temperature when the ratio of water to phosphorus vapor was below 16:1. Good results were produced with ratios in the range from 16:1 to 30:1. Ratios above 30:1 gave satisfactory oxidation of phosphorus but produced a weak phosphoric acid which was too dilute for many purposes.

Example IV

A platinum and aluminum phosphide catalyst was prepared as described above. Mixtures of vapors of phosphorus and water were passed over this catalyst at temperatures in the range from 700° to 800° C. at a space velocity of 500 volumes per volume of catalyst per hour. The ratio of water to phosphorus in these mixtures varied from 22:1 to 30:1. From 89.9 per cent to 99.7 per cent of the phosphorus was oxidized under these conditions, yielding a complex equilibrium mixture in which almost all phosphorus present was oxidized to trivalent or pentavalent state.

These tests showed excellent activity and stability of the catalysts used. It was found that the platinum still dissolved to some extent, but not nearly to so great a degree as when used alone as in platinum gauze or when supported on conventional supports.

Copper supported on a mixture of aluminum meta- and orthophosphates is the preferred catalyst because of the greater cost of platinum catalysts.

Having described my invention and explained its operation, I claim:

1. A process for the oxidation of phosphorus with steam which comprises mixing superheated steam and phosphorus vapor in proportions in the range from about 16:1 to 30:1; passing the resulting mixture of vapors over and in intimate contact with a catalyst comprising copper supported on a mixture of aluminum orthophosphate and aluminum metaphosphate in such proportions that said mixture contains from about 75 per cent to 78 per cent phosphorus pentoxide and from about 25 per cent to 22 per cent alumina in a reaction zone; maintaining the temperature of the catalyst and vapors in contact therewith in the range from about 650° to 900° C.; maintaining the rate of flow of said vapors over said catalyst in the range from about 500 to 2000 volumes of vapor per volume of catalyst per hour; and withdrawing a complex vaporous equilibrium mixture, in which substantially all phosphorus is oxidized to pentavalent and trivalent states, from said reaction zone.

2. A process for the oxidation of phosphorus with steam which comprises mixing superheated steam and phosphorus vapor in proportions in the range from about 20:1 to 25:1; passing the resulting mixture of vapors over and in intimate contact with a catalyst comprising copper supported on a mixture of aluminum orthophophate and aluminum metaphosphate in such proportions that said mixture contains from about 75 per cent to 78 per cent phosphorus pentoxide and from about 25 per cent to 22 per cent alumina in a reaction zone; maintaining the temperature of the catalyst and vapors in contact therewith in the range from about 650° to 700° C.; maintaining the rate of flow of said vapors over said catalyst in the range from about 500 to 2000 volumes of vapor per volume of catalyst per hour; and withdrawing a complex vaporous equilibrium mixture, in which substantially all phosphorus is oxidized to pentavalent and trivalent states, from said reaction zone.

3. A process for the oxidation of phosphorus with steam which comprises mixing superheated steam and phosphorus vapor in proportions in the range from about 16:1 to 30:1; passing the resulting mixture of vapors over and in intimate contact with a catalyst comprising a material selected from the group consisting of copper, copper phosphide, platinum, and the platinum phosphides supported on a material selected from the group consisting of aluminum orthophosphate, aluminum metaphosphate, aluminum phosphide, and mixtures thereof in a reaction zone; maintaining the temperature of the catalyst and vapors in contact therewith in the range from about 650° to 900° C.; maintaining the rate of flow of said vapors over said catalyst in the range from about 500 to 2000 volumes of vapor per volume of catalyst per hour; and withdrawing a complex vaporous equilibrium mixture, in which substantially all phosphorus is oxidized to pentavalent and trivalent states, from said reaction zone.

4. A process for the oxidation of phosphorus with steam which comprises mixing superheated steam and phosphorus vapor in proportions in the range from about 20:1 to 25:1; passing the resulting mixture of vapors over and in intimate contact with a catalyst comprising a material selected from the group consisting of copper, copper phosphide, platinum, and the platinum phosphides supported on a material selected from the group consisting of aluminum orthophosphate, aluminum metaphosphate, aluminum phosphide, and mixtures thereof in a reaction zone; maintaining the temperature of the catalyst and vapors in contact therewith in the range from about 650° to 700° C.; maintaining the rate of flow of said vapors over said catalyst in the range from about 500 to 2000 volumes of vapor per volume of catalyst per hour; and withdrawing a complex vaporous equilibrium mixture, in which substantially all phosphorus is oxidized to pentavalent and trivalent states, from said reaction zone.

KELLY L. ELMORE.

REFERENCES CITED

The following references are of record in the file of this patent:

UNITED STATES PATENTS

| Number | Name | Date |
| --- | --- | --- |
| 1,605,960 | Liljenroth | Nov. 9, 1926 |
| 1,673,691 | Liljenroth | June 12, 1928 |
| 1,807,790 | Liljenroth | June 12, 1931 |
| 1,882,712 | Andrussow | Oct. 18, 1932 |